United States Patent [19]
Nagata

[11] Patent Number: 5,800,026
[45] Date of Patent: Sep. 1, 1998

[54] ELASTIC-BODIED CRAWLER PLATE AND CRAWLER BAND

[75] Inventor: Yoshiyuki Nagata, Tatsukuchi, Japan

[73] Assignee: Komatsu Ltd., Tokyo, Japan

[21] Appl. No.: 750,288

[22] PCT Filed: May 30, 1995

[86] PCT No.: PCT/JP95/01046

§ 371 Date: Dec. 2, 1996

§ 102(e) Date: Dec. 2, 1996

[87] PCT Pub. No.: WO95/32885

PCT Pub. Date: Dec. 7, 1995

[30] Foreign Application Priority Data

Jun. 1, 1994 [JP] Japan .................. 6-143922

[51] Int. Cl.$^6$ .................................. B62D 55/275
[52] U.S. Cl. ................... 305/46; 305/189; 305/191
[58] Field of Search ............... 305/46, 51, 185, 305/187, 189, 191, 192

[56] References Cited

U.S. PATENT DOCUMENTS

| | | | |
|---|---|---|---|
| 4,588,233 | 5/1986 | DenBesten | 305/51 |
| 5,261,733 | 11/1993 | Hara | 305/51 X |
| 5,482,365 | 1/1996 | Peterson et al. | 305/51 X |
| 5,630,657 | 5/1997 | Kumano et al. | 305/189 X |

FOREIGN PATENT DOCUMENTS

| | | |
|---|---|---|
| 44-19610 | 8/1969 | Japan . |
| 56-6915 | 2/1981 | Japan . |
| 56-98671 | 8/1981 | Japan . |
| 57-5383 | 1/1982 | Japan . |
| 59-80175 | 5/1984 | Japan . |
| 63-67388 | 5/1988 | Japan . |
| 3-47290 | 5/1991 | Japan . |
| 3-77794 | 8/1991 | Japan . |
| 4-56593 | 5/1992 | Japan . |
| 4-84092 | 7/1992 | Japan . |
| 5-78684 | 10/1993 | Japan . |
| 5-286463 | 11/1993 | Japan . |
| 5-305883 | 11/1993 | Japan . |
| 6-10088 | 2/1994 | Japan . |

Primary Examiner—Russell D. Stormer
Attorney, Agent, or Firm—Sidley & Austin

[57] ABSTRACT

The present invention is an elastic-bodied crawler plate and crawler band which have a service life substantially equal to that of an integral rubber crawler band and are convenient to replace at the time when damaged or the like. To this end, an elastic-bodied crawler plate (10) integrally formed by embedding a core body (2) in an elastic body (1), is constructed so that a side surface in a longitudinal direction of a link is defined by an inversely-warped initial contact surface (1d) which extends from a link mounting surface side to a ground contacting surface side, and a subsequent contact surface (1e), which connects an end of the ground contacting surface side of the inversely-warped initial contact surface (1d) and an end of a ground surface (11). Further, an endless crawler band (100) is connected so as to provide a specified space (e) between rectangular parallelepiped elastic bodies (1A) of adjacent elastic-bodied crawler plates (10a, 10b).

31 Claims, 7 Drawing Sheets 5,800,026

1

ELASTIC-BODIED CRAWLER PLATE AND CRAWLER BAND

TECHNICAL FIELD

The present invention relates to an elastic-bodied crawler plate and an endless crawler band, and particularly to an elastic-bodied crawler plate and an endless crawler band for crawler vehicles of construction equipment, agricultural machinery, etc.

BACKGROUND ART

Conventionally, in a crawler vehicle, such as a bulldozer or the like, a track frame is provided between an idler wheel and a drive sprocket, with a plurality of upper rolling wheels and lower rolling wheels being provided on upper and lower parts of this track frame and with a steel crawler band winding around each of these rolling wheels; and the vehicle is moved by driving the drive sprocket. In this ordinary steel crawler band, a steel crawler plate 42 is clamped to a pair of right and left links 41a and 41b by bolts 43, with links 41a and 44a, which are longitudinally adjacent to each other, being connected together by the pin 45, and with links 41b and 44b, which are longitudinally adjacent to each other, being connected together by a pin 45; and this ordinary steel crawler band is integrally and endlessly formed, as illustrated in FIGS. 12A and 12B. In the drawings, 46 is a nut.

However, a steel crawler band with the above-described construction has a disadvantage of directly contacting and damaging the surface of a road when a vehicle equipped with the steel crawler band travels on the pavement, etc., to a site for operation; therefore, the surface of the road requires protection by laying down a mat or the like thereon for protecting the road surface. Accordingly, a long time is required for traveling which causes a reduction in operational efficiency. In addition, great vibration and noise are generated while traveling, and especially for construction in urban areas, it is necessary to reduce these vibrations and noise.

As a crawler band eliminating these above-described disadvantages, an integrally formed rubber crawler band is adopted in which metal core members are embedded at specified intervals in an endless rubber band, and the band is driven by engaging these metal core members with a drive sprocket so that a long practical service life is obtained. However, there are disadvantages whereby even a crack or the like generating at only one point can easily result in cutting the rubber crawler band, so that the use of the rubber crawler band itself cannot be continued, since the rubber crawler band is integrally formed.

Next, as another crawler band eliminating disadvantages of a steel crawler band such as damage on a road surface, etc., there are the following crawler bands and crawler plates.

a) A crawler band is known in which a crawler plate is made by covering a metal core member with rubber in the form of a block, and this rubber crawler plate is directly clamped to a link by a bolt (refer to, for example, Japanese Utility Model Application Laid-open No. 4-56593).

However, in this rubber crawler plate, in which rubber is bonded to a metal core member having a convex-concave surface, elastic distortion of the rubber is blocked by this convex-concave surface and distortion is concentrated, so that fatigue cracks are easily generated in the vicinity of the convex-concave surface; thus, this rubber crawler plate has an inadequate service life. Other crawler plates, in which

2 metal core members are covered, are disclosed in Japanese Utility Model Application Laid-open No. 3-47290 and in Japanese Patent Application Laid-open No.5-286463.

However, since these are crawler plates in which metal core members and links are integrally formed, at the time of the replacement of a rubber crawler plate as a result of damage, etc., it is necessary to replace and assemble a rubber plate integrally formed by attaching and detaching the link pins to replace only one plate; and it becomes a burdensome operation requiring a number of man hours, so that they have the disadvantage of being inconvenient to replace. Further, the replacement of the links is also included, so that they also have a disadvantage economically.

b) It is known that rubber or the like can be bonded with a metal plate having a convex-concave part formed so as to hold the grouser on the ground facing surface side of the steel crawler plate, and the metal plate and the links are clamped by a bolt with the steel crawler plate between them (refer to, for example, Japanese Utility Model Application Laid-open No. 5-78684). Similarly, it is known that rubber or the like can be fastened to a steel plate formed so as to hold the grouser therein, then this steel plate and the steel crawler plate are clamped by a bolt, and this steel crawler plate and the links are further clamped by the bolt (refer to, for example, Japanese Utility Model Application Laid-open No. 6-10088).

However, in these crawler plates, the inside of the elastic bodies have uneven elastic distortion because of the grouser of the steel crawler plates, and fatigue cracks quickly generate at these points, so that these crawler plates have an inadequate service life.

c) It is known that rubber can be bonded only on the ground facing surface side of a steel crawler plate by baking, and this rubber crawler plate and the links are clamped (refer to, for example, Japanese Patent Application Laid-open No. 5-305883).

However, such a crawler plate has a thinner portion in the thickness of the rubber, and a crack, fracture, or the like is easily generated, so that such a crawler plate has an inadequate service life. The invention which improves this foremost end portion is disclosed in Japanese Utility Model Application Laid-open No. 4-84092. However, when the rubber crawler band rides on a small stone or the like, the crawler band inversely warps, with the rubber winding around the portions which become inversely-warping stoppers at this time, that is, the foremost end portions in a longitudinal direction of the crawler plate, and with the thickness of the rubber being inadequate, so that stress thereon becomes high, a crack is easily generated. Further, the right and left foremost end portions of the crawler plate are not covered with rubber, so that there is a disadvantage of easily generating a crack, fracture, etc.

BRIEF SUMMARY OF THE INVENTION

The present invention is made in order to eliminate the above-described disadvantages of the conventional art, and its object is to provide an elastic-bodied crawler plate and an endless crawler band which have a service life for the crawler plate substantially equal to that of an integral rubber crawler band and which provide convenience in replacing a crawler plate when the crawler plate is damaged.

The first aspect of the elastic-bodied crawler plate relating to the present invention is a crawler plate of an endless crawler band, constructed by clamping the crawler plate to a link by bolts and by connecting a plurality of links with the crawler plate attached thereto by pins, and is characterized by the crawler plate including an elastic body, provided with an inserting hole for the bolt, and a core body, provided with a bolt fitting hole. This core body is integrally formed by being embedded in the elastic body, and is characterized by the core body having a bolt head bearing surface and an area in the vicinity thereof and a link mounting surface and an area in the vicinity thereof respectively exposed, i.e., not covered with the elastic body. It is preferable that, in a section in a longitudinal direction of the link of the elastic-bodied crawler plate, i) a ground facing surface has a flat surface or a curved surface substantially parallel to the link mounting surface, ii) a total width of the crawler plate in the longitudinal direction of the link is smaller than a link pitch, iii) a width of the ground facing surface in the longitudinal direction of the link is smaller than the total width of the crawler plate, iv) a side surface, in the longitudinal direction of the link, is formed by an inversely-warped initial contact surface extending from the link mounting surface side toward the ground facing surface side, and a subsequent contact surface, connecting the end portion of this inversely-warped initial contact surface closest to the ground facing surface with the end portion of the ground facing surface, and v) an angle formed by a line, extending from a center of a link pin tangential to the inversely-warped initial contact surface, with a line extending from the center of the link pin perpendicular to the ground facing surface, is equal to or less than an angle formed by a line connecting the center of the link pin to the subsequent contact surface with the line extending from the center of the link pin perpendicular to the ground facing surface.

On the ground facing surface side of the elastic-bodied crawler plate, a square ground contacting surface can be formed in a central portion in the longitudinal direction of the crawler plate, with a tapering trapezoidal ground contacting surface formed on both ends of the square ground contacting surface in the longitudinal direction of the crawler plate, and a steering surface in the form of a slanting trapezoid can be formed between the trapezoidal ground contacting surface and a side end portion in the longitudinal direction of the elastic-bodied crawler plate. The above-described square ground contacting surface can be a square ground contacting surface forming a concave portion to the trapezoidal ground contacting surface. In addition, the ratio of a height from the surface of the ground contacting surface to the core body, to the link pitch can be in the range of 0.26 to 0.4. The ratio of a distance from the side surface, in the longitudinal direction of the link, of the ground contacting surface having the bolt inserting hole to the inner surface of the bolt inserting hole to a hole diameter of the bolt inserting hole can be 0.75 or more. Further, the ratio of a concave portion depth of the square ground contacting surface to the height from the ground contacting surface to the core body is larger than 0 and is 0.49 or less. Furthermore, the ground facing surface of the core body can be a smooth surface.

According to the first aspect of the invention with the above-described construction, by embedding the core body other than the link and the bolt attaching surfaces in the elastic body, the core body and the elastic body have a larger contacting area so that higher bonding force can be obtained, and the end portion of the bonding area, which easily forms a starting point of a crack at the time of operation, is positioned in a portion with smaller stress caused by deformation or the like, so that the generation of cracks can be sharply reduced.

As for the surface, in the longitudinal direction of the link, of the crawler plate (elastic crawler plate) which contacts an adjacent crawler plate at the time of inverse warping of the crawler plate, the inversely-warped initial contact surfaces are in positions nearer to the link mounting surfaces than to the ground contacting surfaces and begin to contact each other, unlike the conventional art in which the elastic bodies contact in the vicinity of the ground contacting surfaces. More specifically, in the conventional art, when riding on stones, etc., the deformation caused by the elastic bodies contacting each other in the vicinity of the ground contacting surfaces is synergistic with the deformation caused by riding on stones, etc., to cause the ground contacting surfaces of the rubber crawler plates to locally deform so as to generate great stress, so that cracks, etc., are easily generated. On the other hand, in the present invention, the inversely-warped initial contact surface is near the link mounting surface, so that the ground contacting surface of the elastic body can be prevented from being locally deformed. As the inversely-warped angle increases, the contacting area is expanding in the direction of both sides of the inversely-warped initial contact surfaces, that is, in the directions of the link mounting surface side and of the ground contacting surface side, and the repulsive elastic force of the adjacent elastic-bodied crawler plates to each other is increased, so that the load is dispersed to the adjacent crawler plate, and local deformation caused by the concentrated load is not generated. Further, by the above-described construction, even when riding over comparatively large stones, etc., the inversely-warped elastic body rides thereon in such a way as to cover the stones, etc., so that uneven distortion is not generated inside the elastic body and gradual elastic deformation can be obtained.

As for the ground contacting surface side of the crawler plate, trapezoidal ground contacting surfaces, with the width becoming smaller towards the end surfaces, are provided on both ends, in the longitudinal direction of the crawler plate, of the square ground contacting surface, so that tortional deformation can be reduced even when the end portion of the crawler plate rides on earth, etc., at the time of operation, and greater tractive force can be obtained. Slanting surfaces formed on both sides, in the longitudinal direction of the link, of these trapezoidal ground contacting surfaces prevent a sideslip of the crawler plate by holding earth and easily remove any stones caught therein. In addition, steering surfaces, in the form of a slanting trapezoid, are formed on both right and left end portions on the ground surface side, so that steering resistance becomes smaller compared to the case in which these slanting surfaces are not formed, and excellent operability can be obtained.

By forming a square ground contacting surface having a concave portion, and by providing specified ratios in a depth of the concave portion of the square ground contacting surface, a height from the trapezoidal ground contacting surface to the core body, and a distance between the end portion of the ground contacting surface and the inner surface of the bolt inserting hole, the extent of the external damage on the ground contacting surface side after a test of specified time can be reduced. Further, the core body has a smooth surface on its ground facing surface side, so that the elastic body is evenly deformed at the time of operation, unlike the case of the conventional metal core member having a projecting portion; thus, the generation of cracks can be reduced.

The second aspect of the elastic-bodied crawler plate relating to the present invention is a crawler plate of an endless crawler band constructed by clamping the crawler plate to the links by bolts, and connecting a plurality of links with the crawler plates attached thereto by pins, and is characterized by the crawler plate including an elastic body in the form of a trapezoidal elastic body and a rectangular parallelepiped elastic body integrally formed on the bottom of the trapezoidal elastic body; by the core body, with smooth surfaces on both the top and bottom thereof, being integrally formed by being embedded in the rectangular parallelepiped elastic body; by the elastic body being provided with bolt inserting holes, with the core body being provided with bolt attaching holes having bolt head bearing surfaces and an area in the vicinity thereof, and a link mounting surface and an area in the vicinity thereof respectively being exposed; and by the trapezoidal elastic body gradually decreasing the trapezoidal sectional area from the region of the bolt inserting holes forming a central portion in the longitudinal direction of the crawler plate to the ends on both sides, in the longitudinal direction of the crawler plate, to form slanting surfaces of a trapezium on both side surfaces, in the longitudinal direction of the link, of the trapezoidal elastic body.

By the above-described construction, as in the first aspect of the invention, the elastic body is evenly deformed so that the generation of cracks can be reduced, and any stones caught therein are easily removed, while a sideslip of the crawler plate is prevented.

The endless crawler band relating to the present invention is characterized by the elastic-bodied crawler plate of the above-described second aspect of the invention being clamped to the links by bolts, with a plurality of clamped links being connected by pins, so that a specified space is provided between the rectangular parallelepiped elastic bodies of the adjacent elastic-bodied crawler plates to construct an endless crawler, characterized by the above-described specified space being a space in which respective curved lines, in the form of a circular arc, pass through the boundary portions between the rectangular parallelepiped elastic bodies and the trapezoidal elastic bodies on the opposing surfaces of the adjacent elastic-bodied crawler plates, with the centers of the link pins on the other side of the adjacent elastic-bodied crawler plates as the centers thereof, have a point of intersection between the opposing rectangular parallelepiped elastic bodies, and characterized by the boundary portions becoming inversely-warped contact portions when the endless crawler is inversely-warped, so that the adjacent elastic-bodied crawler plates contact each other.

According to the above-described construction, as the inversely-warped angle becomes larger, the elastic bodies are warped with the amount of lap increasing, and the elastic members of the adjacent crawler plates become contacting members, compressing each other and at the same time repelling each other, so as to become stoppers in the inversely-warped direction of the link. Thereby, when inversely-warping is generated on the ground facing side of the crawler band at the time of traveling, the adjacent crawler plates contact each other and elastic repulsive force additionally bears the vehicle weight, so that the durability of the elastic bodies is improved. In addition, when inverse warping is generated on the non-ground side of the crawler band at the time of traveling, the elastic members forming the opposing surfaces of the adjacent crawler plates become the inversely-warping stopper, so that the crawler band can be prevented from twisting while traveling.

BEST MODE FOR CARRYING OUT THE INVENTION

A preferable embodiment of the elastic-bodied crawler plate and the crawler band relating to the present invention will be particularly described below with reference to the attached drawings.

Figure 1:
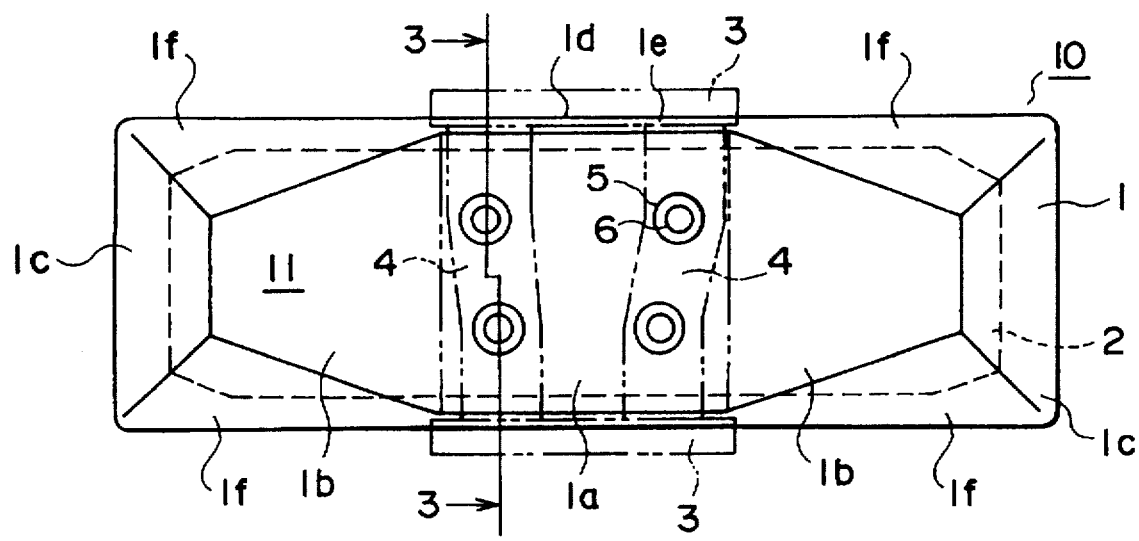
FIG. 1 is a plan view of an elastic-bodied crawler plate relating to the first embodiment of the present invention, seen from the ground surface side.
Figure 2:
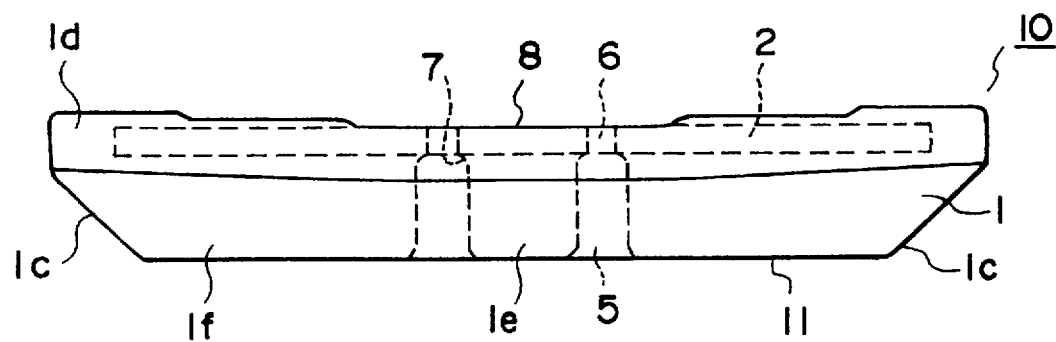
FIG. 2 is a front view of the elastic-bodied crawler plate in the first embodiment.
Figure 3:
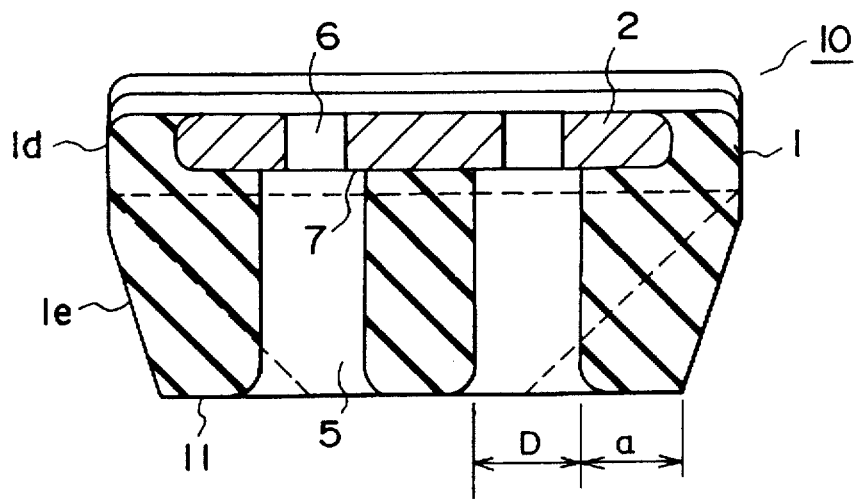
FIG. 3 is a sectional view taken along line 3—3 in FIG. 1.

In FIG. 1 to FIG. 3, an elastic-bodied crawler plate 10 of the first embodiment is defined and is integrally formed by a core body 2 and an elastic body 1 having the core body 2 embedded therein so as to be covered therewith. This embedded core body 2, in the form of a substantially rectangular plate, has a mounting surface 8 for a pair of links 4 and an area in the vicinity of the mounting surface 8, bolt head portion bearing surfaces 7 and their external perimeter, and bolt holes 6, which are exposed, i.e., not covered with the elastic body 1. In FIG. 2, showing the elastic-bodied crawler plate 10 in its longitudinal direction, the length of the core body 2 is greater than a ground contacting surface 11.

On the other hand, the ground facing surface side of the elastic body 1 is provided at four positions with bolt inserting holes 5, each having a hole diameter D, and comprises: a square ground contacting surface 1a at the central portion in the longitudinal direction of the elastic-bodied crawler plate 10, trapezoidal ground surfaces 1b at both right and left sides of this square ground surface 1a (the boundary between the square ground surface 1a and each trapezoidal ground surface 1b on the drawing is illustrated by a two-dot chain line in FIG. 1), steering surfaces 1c at both ends, each in the form of a trapezoid slanting toward the link mounting surface side, slanting surfaces 1f extending from the end portions of the trapezoidal ground surfaces 1b and the steering surfaces 1c toward the link mounting surface side; subsequent contact surfaces 1e, each forming a slanting surface extending toward the link mounting surface side from a side portion of the square ground contacting surface 1a; and inversely-warped initial contact surfaces 1d, each extending from a subsequent contact surface 1e to the end portions of the link mounting surface. This slanting surface 1f is a trapezium. The ratio of a distance a (refer to FIG. 3), from the side portion of the ground surface 11 of this subsequent contact surface 1e to the inner surface of the bolt inserting hole 5, to the hole diameter D of the bolt inserting hole 5 is 0.75 or more.

As FIG. 1 illustrates, the elastic-bodied crawler plate 10 is secured to a pair of links 4 by means of bolts which are not illustrated in the drawings, and a plurality of links 4, having this elastic-bodied crawler plate 10 attached thereto, are pivotally connected by means of pins 3 so as to define a crawler band.

Figure 4:
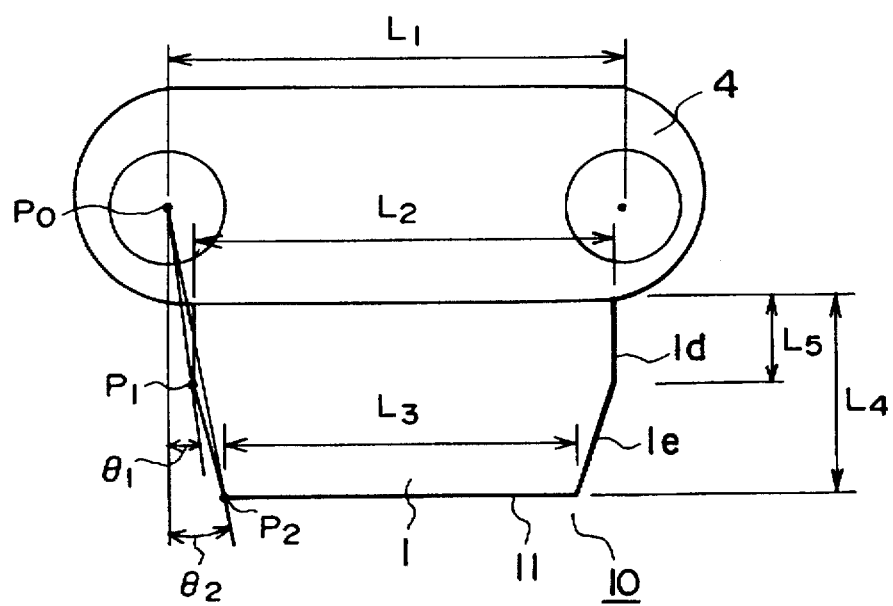
FIG. 4 is a condition in which the elastic-bodied crawler plate in the first embodiment is clamped to the links and is an explanatory view seen from a side surface.

FIG. 4 illustrates an explanatory view of an end surface of this elastic-bodied crawler plate 10 in a condition in which the crawler plate is secured to the links 4. The ground contacting surface 11 is a flat surface or a curved surface which is substantially parallel to the mounting surface of the link 4, and a total width L2 of the elastic-bodied crawler plate is smaller than a link pitch L1, while a width L3 of the ground contacting surface 11 is smaller than the total width L2 of the elastic-bodied crawler plate 10. This total width L2 is made to be smaller than the link pitch L1; however, when the pressure on the ground contacting surface 11 is high, it is preferable in most cases to make the value of the total width L2 to be close to the value of the link pitch L1 to reduce the pressure on the ground contacting surface 11 and to increase the mass of the elastic body 1.

An angle θ1, which is formed by a line extending from a center P0 of a link pin so as to be tangential to the inversely-warped initial contact surface 1d, and a line extending from the center P0 of the link pin so as to be perpendicular to the ground contacting surface 11, is equal to or less than an angle θ2 formed by a line connecting the center P0 of the link pin to an arbitrary point P2 on the subsequent contact surface 1e, and the line extending from the center P0 of the link pin perpendicular to the ground contacting surface 11. FIG. 4 shows that the inversely-warped initial contact surface 1d is a flat surface substantially parallel to the above-described line which is perpendicular to the ground contacting surface 11, and that the subsequent contact surface 1e is a surface slanting from a contact point P1 (an initial contact portion, which is also the end portion of the inversely-warped contact surface 1d closest to the ground contacting surface 11), to the ground contacting surface end portion P2; however, the inversely-warped initial contact surface 1d is also a surface having a portion with which the adjacent elastic body 1 starts to contact when inverse warp occurs, so that the inversely-warped initial contact surface 1d can be a curved surface, a concave surface, a convex surface, etc.

Accordingly, it is obvious that the tangential line forming the angle θ1 is not limited to the line connecting the center P0 of the link pin and the lower end portion of the inversely-warped initial contact surface 1d; for example, when the inversely-warped initial contact surface 1d is a convex surface, the contact point P1 forming the inversely-warped initial contact portion can be in the middle portion of the convexly curved surface. The subsequent contact surface 1e is a surface with which the adjacent elastic body 1 contacts after the contact point P1 of the inversely-warped initial contact surface 1d contacts the adjacent elastic body 1, and can be a curved surface, a concave surface, a convex surface, a compound surface created by two or more surfaces, etc.

Further, the side surface extending from the link mounting surface to the end portion of the ground contacting surface 11, that is, the inversely-warped initial contact surface 1d and the subsequent contact surface 1e, can be a curved surface such as a convex surface, etc., a continuously curved surface, a compound surface connecting a number of flat planes, etc., and can be a surface having the contact point P1 at a position closer to the link mounting surface 8 than the ground contacting surface 11.

Further, as for the position of the contact point P1 of the inversely-warped initial contact surface 1d in the direction of the height of the elastic body 1, the contact point P1 can be at any position closer to the link mounting surface 8 than the ground contacting surface 11; however, considering the prevention of local deformation in the vicinity of the ground contacting surface 11, a value of the ratio L5/L4≦0.8 is preferable. Here, L4 is the distance between the link mounting surface and the ground contacting surface 11 of the elastic body 1, and L5 is the distance between the link mounting surface 8 and the contact point P1 of the elastic body 1. Considering gentle deformation, etc., of the entire body of the adjacent elastic body 1, it is further preferable that the ratio L5/L4 be in the region of 0.6 or less.

In this construction, first of all, the core body 2, except for the portions whereto the links 4 and the bolts are attached, is embedded in the elastic body 1, so that the area where the core body 2 and the elastic body 1 contact is large, and high bonding force can be obtained. In addition, the elastic body 1 is deformed by tractive force, rotational resistance force, etc., added thereto at the time of operation, and the edge of the portion where the core body 2 and the elastic body 1 bond together easily falls off, but the core body 2 is covered with the elastic body 1, so that the frequency of the occurrence of the edge portion falling off can be greatly reduced. Further, the length of the core body 2, in the longitudinal direction of the elastic-bodied crawler plate 10, is greater than the length of the ground contacting surface 11, so that the core body 2 supports a load when conducting an operation laterally, or when running across bumps; therefore, the elastic-bodied crawler plate 10 is prevented from being damaged.

As for the sides of the ground contacting surface 11 of the elastic-bodied crawler plate 10, wherein the width of the trapezoidal ground contacting surfaces 1b become smaller towards the end surfaces, even if an end portion of the elastic-bodied crawler plate 10 runs on the earth, etc., tortional deformation is small and the elastic-bodied crawler plate 10 is excellently engaged into wet ground, etc., so that greater tractive force can be obtained. The slanting surface 1f prevents a sideslip of the crawler plate 10 by firmly holding the earth, and excellently removes the stones caught therein. Further, with each steering surface 1c in the form of a slanting trapezoid, the steering resistance becomes small compared to the case in which these slanting surfaces are not formed, so that excellent operability can be obtained.

Figure 5A:
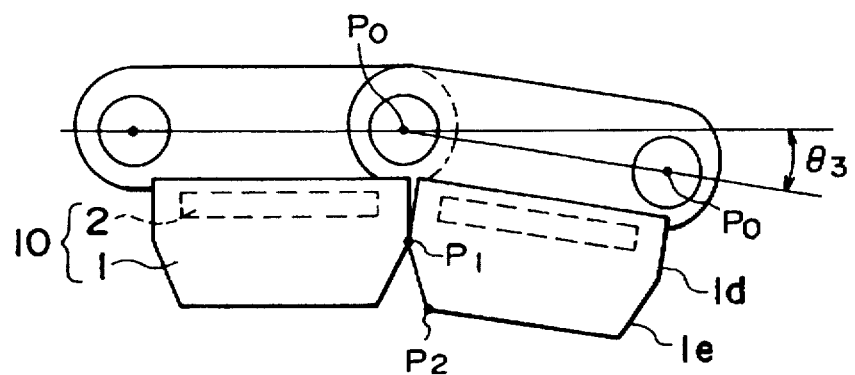
FIGS. 5A and 5B are views illustrating the inverse warping of adjacent elastic-bodied crawler plates in the first embodiment, with FIG. 5A being an explanatory view of the beginning of the inverse warping, and FIG. 5B being an explanatory view when the inversely-warped angle is large.
Figure 5B:
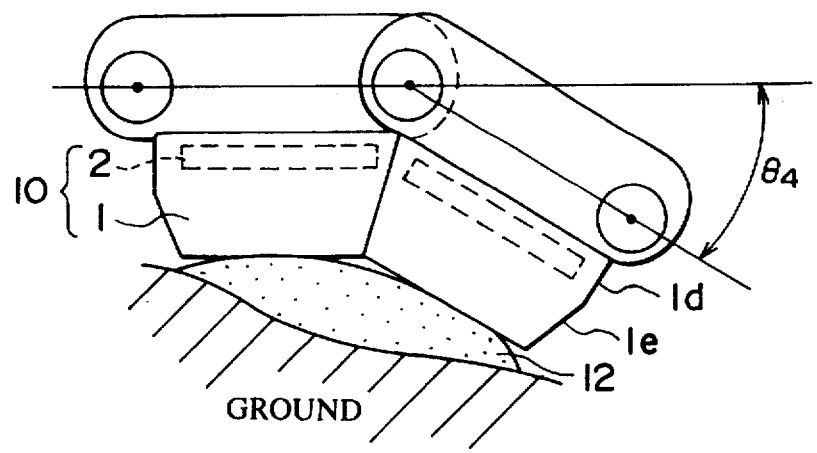

FIGS. 5A and 5B are schematic views of two inversely-warping elastic-bodied crawler plates 10 adjacent to each other. As FIG. 5A illustrates, inverse warping brings about an inversely-warped angle θ3. In the present embodiment, as described in the above (refer to FIG. 4), the total width L2 of each elastic-bodied crawler plate is smaller than the link pitch L1, and the angle θ1 at the contact point P1 on the inversely-warped initial contact surface 1d is equal to or less than the angle θ2 at the end portion P2, which is an arbitrary point on the subsequent contact surface 1e. As a result, at the start of inverse warping, the elastic-bodied crawler plates 10 adjacent to each other contact each other at their contact points P1, and then with the angle slightly greater than the initial inversely-warped angle θ3, the vicinities around the contact points P1 contact each other, with the elastic body 1 being slightly deformed. When inverse warping further advances and the angle becomes much greater than the initial inversely-warped angle θ3, most parts of the adjacent inversely-warped initial contact surfaces 1d contact each other, and the contacting portions of the subsequent contact surfaces 1e increase from the contact point P1 , so that deflection of each elastic body 1 is easily released to the ground facing surface side.

As the inversely-warped angle θ3 becomes even greater, the elastic body 1 deflects entirely. Further, when the angle becomes greater so as to be the inversely-warped angle θ4, the deflection generated on the entire body of the elastic body 1 further increases, but local deformations are not generated. For example, when running on a bump 12 with a large extent of convexity, as illustrated in FIG. 5B, the ground contacting surface 11 contacts the large area of the bump 12 so as to cover the bump 12 while almost the entireties of each of the inversely-warped initial contact surfaces 1d and each of the subsequent contact surfaces 1e of the adjacent elastic bodies 1 contact each other, elastically repelling each other to share the load. As described above, with a steep inversely-warped angle being obtained, the load can be prevented from locally concentrating. Further, even when earth, sand, etc., is caught between the contacting surface portions, it is easily removed therefrom when lifting, so that foreign substances are excellently removed.

Figure 8:
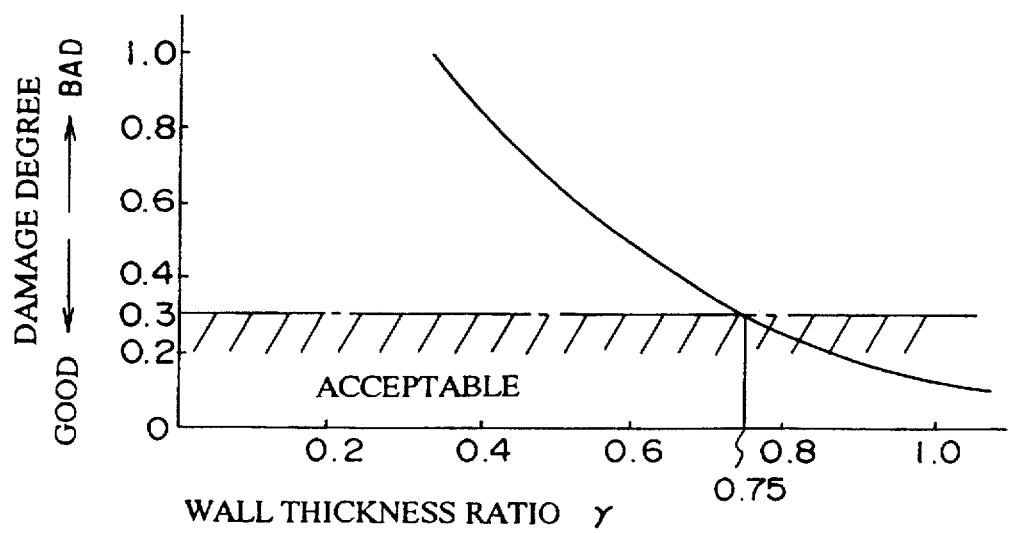
FIG. 8 is a graph showing the relationship between the wall thickness ratio, of the elastic-bodied crawler plate in the first embodiment, and the degree of damage.

FIG. 8 illustrates the relationship between the ratio of the distance a to the hole diameter D (refer to FIG. 3) and the degree of damage on the elastic-bodied crawler plate 10, and is a result of an endurance test by vehicles incorporating various levels of the distance a. Here, as for the degree of the damage on the elastic-bodied crawler plate 10, the degree of damage mainly in the vicinity of the bolt inserting holes 5 on the ground facing side was assessed based on the presence or absence of the value as merchandise. A degree of damage of 0.3 at the end of the endurance test is the limit of the acceptable level. From the result of the endurance test, as the wall thickness ratio γ (=a/D) is increasing, the degree of damage decreases, and an elastic-bodied crawler plate with a wall thickness ratio γ of 0.75 or more is regarded as having value as merchandise.

In the present embodiment, as FIG. 1 illustrates, the trapezoidal ground surfaces 1b are formed between the rectangular ground contacting surface 1a and the steering surfaces 1c; however, the length of the rectangular ground contacting surface 1a in the longitudinal direction of the elastic-bodied crawler plate 10 can be extended and formed so as to contact the steering surface 1c, and the ground contacting edges of the steering surfaces 1c can be formed to be long so as to suit the length of the rectangular contact surface 1a to form the elastic-bodied crawler plate. Explaining with reference to FIG. 6, each elastic-bodied crawler plate can be defined by an elastic body in the form of a trapezoidal elastic body 1B (in the drawing, below the one-dot chain line) and a rectangular parallelepiped elastic body 1A (in the drawing, above the one-dot chain line) integrally formed on top of the trapezoidal elastic body 1B, and the core body 2 with smooth surfaces on the top and bottom, integrally formed by being embedded in the rectangular parallelepiped elastic body 1a.

The form of the core body 2, having a projection such as a convex portion or the like on the ground facing surface, as in the conventional metal core member, can be used as the core body 2 for the elastic-bodied crawler plate of the present invention; however, the ground facing surface is preferably a smooth surface, as illustrated in FIG. 1 to FIG. 3. With this smooth surface being provided, internal stress generated in the elastic body 1 is evenly distributed, so that a starting point of a crack, which often generates in the vicinity of the core body 2, can be prevented from generating. Here, the smooth surface on the ground facing side means a form whereby distortion is not concentrated in the vicinity of the core body 2 of the elastic body 1; that is, a form which is not abruptly changed to be a concave form or a convex form or the like, and a surface having a mild concave surface or convex surface can be suitable besides a flat surface, a curved surface, a slanting surface in the form of a concave surface or a convex surface, etc. Further, an ordinary radius R, fillet, etc., can be applied to the end portion and the corner of the core body 2, in order to prevent stress concentration.

The space between adjacent elastic-bodied crawler plates 10 will be described with reference to FIG. 6. An endless crawler band 100, part of which is illustrated in the drawing, is an endless crawler band in which the elastic-bodied crawler plate in FIG. 1 is fastened to links 4 (4a, 4b) by bolts, and in which a plurality of links 4a and 4b are connected by the pins 3 so as to be pivotable. Here, adjacent elastic-bodied crawler plates 10a and 10b are attached, with a specified space e being provided when the links 4a and 4b are in a straight line condition.

A preferable space e, described above, is determined as follows. Specifically, curved lines Ca and Cb, which have the link pin centers P0a and P0b as their centers with radiuses Ra and Rb, pass through inversely-warped initial contact portions P1a and P1b of the elastic-bodied crawler plates 10a and 10b and intersect at a point of intersection Co. Then, when the opposing upper end portions on the link mounting side of the elastic-bodied crawler plates 10a and 10b are referred to as P3a and P3b, the space e is set so that the point of intersection Co is positioned at the point surrounded by the above-described P1a, P3a, P3b, and P1b. When the point of intersection Co is positioned between P1a and P1b, the inversely-warped initial contact surfaces 1da and 1db contact each other from the beginning, and such a situation is not preferable.

Figure 7:
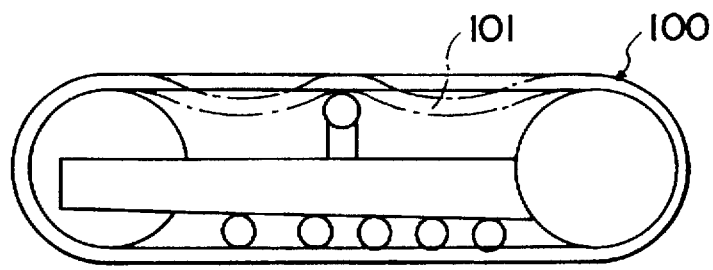
FIG. 7 is an explanatory view of a malfunction in the case when the space, between the adjacent elastic-bodied crawler plates in FIG. 6, is too large.

By setting the above-described specified space e, when traveling on level ground without inversely-warping, the inversely-warped initial contact surfaces 1da and 1db do not contact each other, so that repeated elastic deformation is not generated on the same spot. Accordingly, fatigue failure of the elastic body 1 can be reduced. The upper limit of the position of the point of intersection Co is on the line made by P3a and P3b, since with the point of intersection Co at a position higher than the above-described upper limit, the space between the adjacent inversely-warped initial contact surfaces 1da and 1db becomes too large and the inversely-warped initial contact surfaces 1da and 1db cannot function properly as inversely-warping stoppers. More specifically, even if an extremely large inversely-warped angle is given, the inversely-warped initial contact surfaces 1da and 1db do not contact each other, so that an endless crawler band 101 with an extremely large inversely-warpe angle has "waviness" generated while traveling, and a malfunction, such as the crawler band falling off, etc., easily occurs, as illustrated in FIG. 7.

Figure 6:
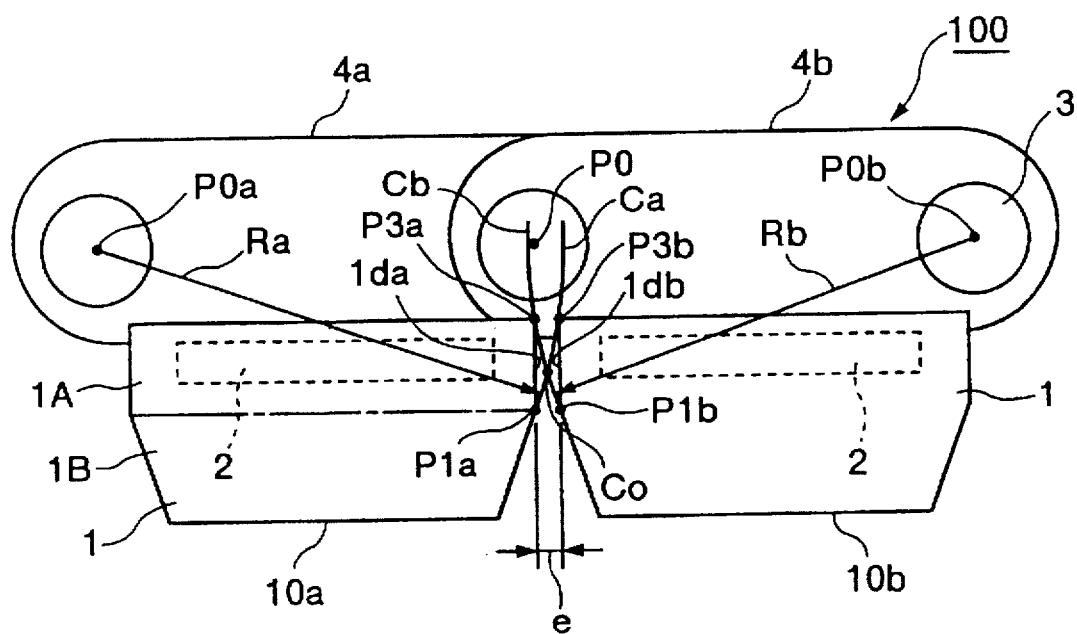
FIG. 6 is an explanatory view of the space between the adjacent elastic-bodied crawler plates in the first embodiment.

A further preferable example of the space e is the case in which the space e is set so that the curved lines Ca and Cb pass through the inversely-warped initial contact points P1a and P1b and the opposing upper end portions P3b and P3a on the link mounting side or the vicinities of the upper end portions P3b and P3a, as illustrated in FIG. 6. In this case, when traveling with inverse warping generating, the inversely-warped initial contact portions P1a and P1b, forming thick wall portions of the elastic bodies 1, contact each other at the beginning, and the contacting area increases as the inversely-warped angle becomes larger. However, great elastic deformations are not generated in the portion with smaller wall thickness; more specifically, in the vicinities of the upper end portions P3a and P3b, and in the portions near the side of the core body 2 on the inversely-warped initial contact surfaces 1da and 1db, so that fatigue failure in these portions with smaller wall thicknesses can be reduced.

From the above, by providing a specified space e, large elastic deformation in the elastic body, especially in the portions with smaller wall thicknesses is prevented when traveling on level ground, or even when traveling on an area generating inverse warping. It is considered to be effective for increasing longevity that the core body 2 has a smooth surface. Further, the elastic-bodied crawler plate 10 is attached and detached only by removing the bolts for attachment as with a steel crawler plate, and can be attached and detached in a short time, so that the elastic-bodied crawler plate 10 is convenient to replace at the time of damage, etc.

Next, the second embodiment of the elastic-bodied crawler plate and the endless crawler band related to the present invention will be described with reference to the attached drawings. The main point of the elastic-bodied crawler plate of the present embodiment which is different from the first embodiment is a construction forming the square ground contacting surface 1a (refer to FIG. 1).

Figure 9:
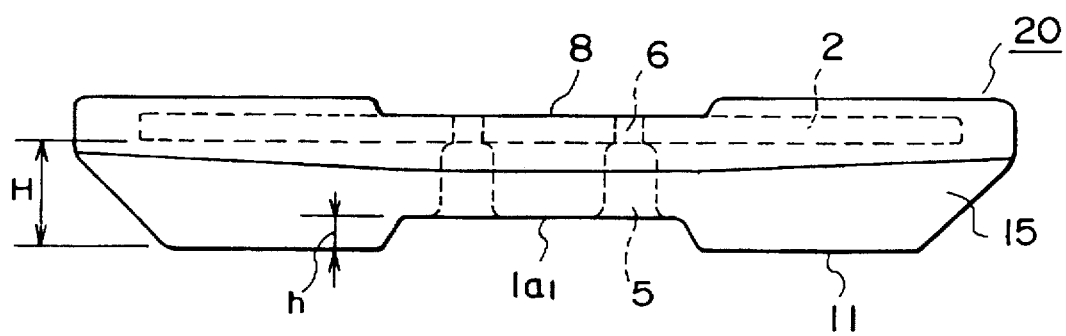
FIG. 9 is a front view of an elastic-bodied crawler plate relating to the second embodiment of the present invention.

In FIG. 9, in an elastic body 15, a concave square ground facing surface portion 1a1, forming a concave portion of the ground surface 11, is formed in the central portion of the ground surface 11 in the longitudinal direction of an elastic-bodied crawler plate 20; and on the upper side of the core body 2, the elastic body 15 is provided with substantially uniform thickness extending up to the link mounting surface 8. The other things are the same as in the elastic-bodied crawler plate 10 in the first embodiment. Here, when the height from the ground contacting surface 11 to the ground facing side surface of the core body 2 is H, the depth from the ground contacting surface 11 to the concave square ground facing surface 1a1 is h, and the link pitch is L1 (refer to FIG. 4), the concave portion depth ratio $\alpha$ (=h/H) is larger than 0 and is 0.49 or less. The lug height ratio $\beta$ (=H/L1) is in the range of 0.26 to 0.4.

Figure 10:
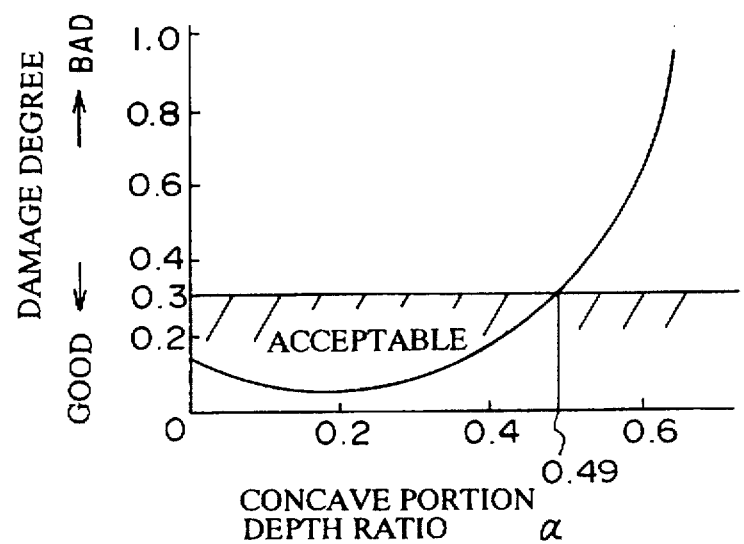
FIG. 10 is a graph showing the relationship between the ratio of the depth, of the concave portion of the elastic-bodied crawler plate in the second embodiment, and the degree of damage.

The elastic-bodied crawler plate 20 in this construction is regarded as having value as merchandise when the concave portion depth ratio $\alpha$ is 0.49 or less, as illustrated in FIG. 10. This is because cracks are easily generated at the root of a lug when the depth of the concave portion is too large. It should be mentioned that the degree of damage and the limit of the passing level are defined as being the same as in FIG. 8.

Figure 11:
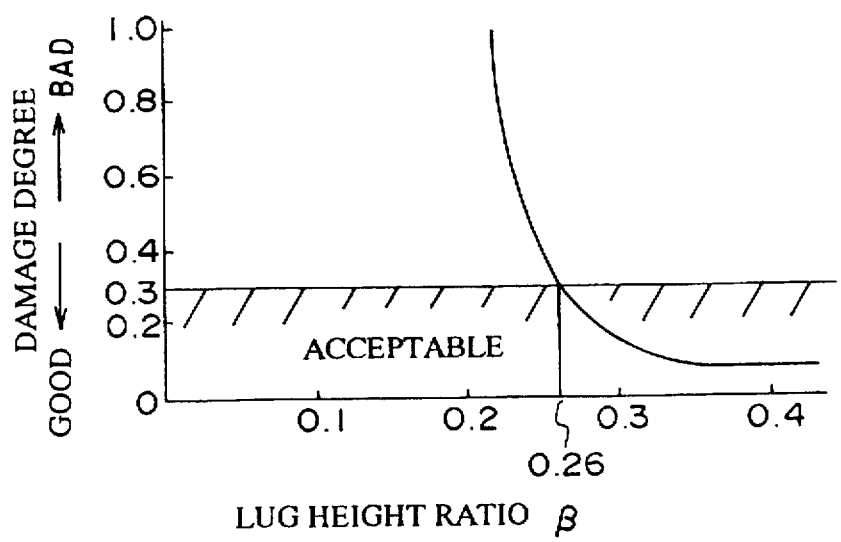
FIG. 11 is a graph showing the relationship between the lug height ratio, of the elastic-bodied crawler plate in the second embodiment, and the degree of damage.
Figure 12A:
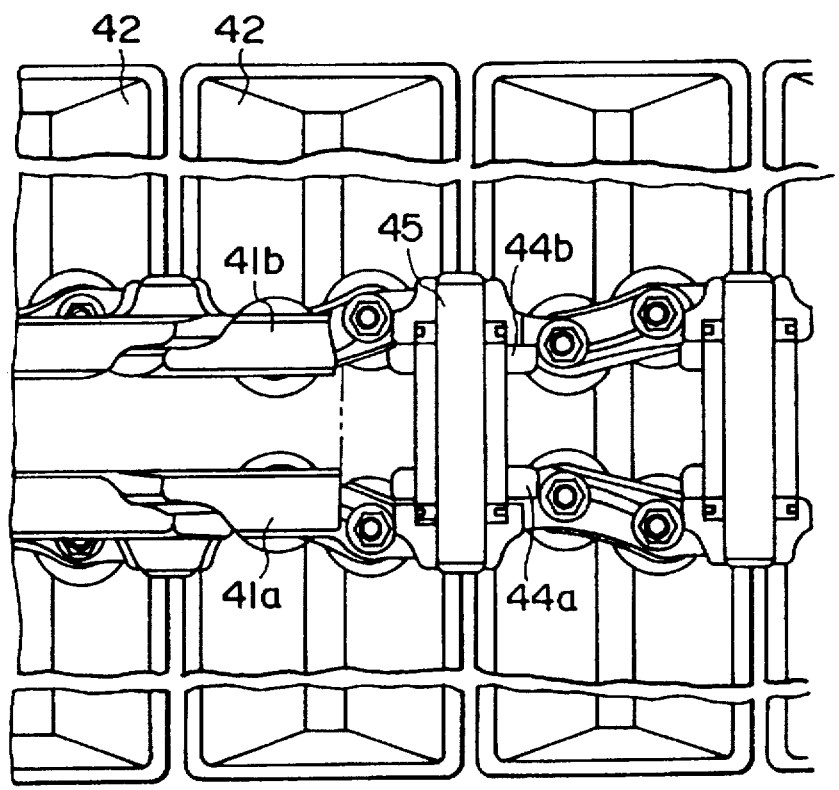
FIGS. 12A and 12B illustrate the construction of an ordinary steel crawler band relating to the conventional art, with FIG. 12A being a plan view and FIG. 12B being a side view.
Figure 12B:
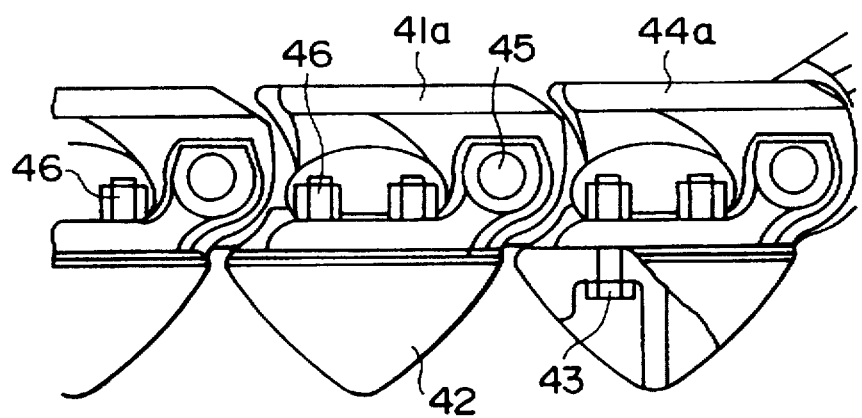

As FIG. 11 illustrates, the elastic-bodied crawler plate 20 is regarded as having value as merchandise when the lug height ratio $\beta$ is 0.26 or more. When the lug height ratio $\beta$ is less than 0.26, the mass of deformation of the elastic body 1 is small, so that the degree of damage increases. When the lug height ratio $\beta$ is more than 0.4, a vehicle may be rocked while operating on the side, and operability such as driving comfort or the like may be reduced, so that the lug height ratio $\beta$ is preferably in the range of 0.26 to 0.4. The relationship between the lug height ratio $\beta$ and the degree of damage (refer to FIG. 8) in the first embodiment is also the same as described above. It should be mentioned that as for the relationship between the wall thickness ratio $\gamma$ (=a/D) and the degree of damage (refer to FIG. 8), the same result is obtained with the elastic-bodied crawler plate 20 in the present embodiment.

In the above, the elastic-bodied crawler plate related to the present invention is described, and as for the elastic body, relatively soft material such as rubber, polyurethane, resin, non-metal composites or the like can be used, while as for the core body, material having strength such as the ordinary conventional metal core member material such as steel, cast steel, cast iron or the like, material having strength such as metal composites, non-metal composites, or the like can be used. This core body is embedded in the elastic body, and ordinary bonding, adhesion, or the like, such as vulcanizing adhesion ordinarily conducted in the case of rubber, or the like, is applied thereto. As for the bolts for attaching to the link, ordinary bolts can be used, but the use of hexagon socket head bolts is preferable because the bolt inserting holes can be made smaller, so that the distance a (refer to FIG. 3) between the bolt inserting hole and the end surface of the square ground facing surface becomes longer and the degree of damage becomes smaller.

Industrial Applicability

The present invention is useful as an elastic-bodied crawler plate and an endless crawler band which have a service life substantially equal to that of an integral rubber crawler band, with the generation of fatigue cracks, etc., of the elastic body being greatly reduced, and which are convenient to replace at the time of damage or the like.

I claim:

1. An elastic-bodied crawler plate having a longitudinal length, a transverse width, a link mounting surface side, a ground contacting surface side, opposite longitudinally extending sides, and opposite longitudinal ends, said crawler plate comprising:

an elastic body including holes for inserting bolts therethrough;

a core body having a smooth top surface, without an abrupt convex or concave form, and a smooth bottom surface, without an abrupt convex or concave form; said smooth top surface including a link mounting surface; said core body having a plurality of bolt attaching holes formed therein so as to extend through said link mounting surface;

said crawler plate being integrally formed by said core body being embedded in said elastic body with said core body having exposed surfaces which are not covered by said elastic body and with said link mounting surface side including said link mounting surface; said exposed surfaces including bolt head bearing surfaces and said link mounting surface.

2. A crawler plate in accordance with claim 1, wherein said ground contacting surface side includes a ground contacting surface, and wherein a width of said ground contacting surface gradually decreases from a central area of said crawler plate toward each longitudinal end of said crawler plate, without changing the width of said link mounting surface side of said crawler plate.

3. A crawler plate in accordance with claim 1, wherein said elastic body comprises a rectangular parallelepiped elastic body section forming an elastic body portion of said link mounting surface side of said crawler plate and a trapezoidal elastic body section forming an elastic body portion of said ground contacting surface side of said crawler plate.

4. A crawler plate in accordance with claim 3, wherein said trapezoidal elastic body section has longitudinally extending sides and opposite ends, wherein each longitudinally extending side of said trapezoidal elastic body section comprises first and second slanting surfaces with each extending from said central area of said crawler plate to a respective end of said trapezoidal elastic body section.

5. A crawler plate in accordance with claim 4, wherein each end of said trapezoidal elastic body section is in the form of a trapezoidal end surface slanting in an inward direction from said rectangular parallelepiped elastic body section to said ground contacting surface.

6. A crawler plate in accordance with claim 1 wherein said transverse width of the crawler plate is smaller than a link pitch when links are mounted on said link mounting surface.

7. A crawler plate in accordance with claim 1 wherein said ground contacting surface side includes a ground contacting surface which extends substantially parallel to said link mounting surface and to said longitudinal length of said crawler plate.

8. A crawler plate in accordance with claim 7 wherein a width of said ground contacting surface is smaller than said transverse width of said crawler plate.

9. A crawler plate in accordance with claim 7 wherein each longitudinally extending side of said crawler plate includes an inversely-warped initial contact surface, extending from said link mounting surface side toward said ground contacting surface side, and a subsequent contact surface, connecting an edge, closest to said ground contacting surface, of said inversely-warped initial contact surface with an edge of said ground contacting surface.

10. A crawler plate in accordance with claim 9 wherein an angle, which is formed by (a) a line extending from a link pin center of a link, when mounted on said crawler plate, to said inversely-warped initial contact surface and (b) a line extending from the link pin center perpendicular to said ground contacting surface, is equal to or less than an angle, which is formed by (a) a line connecting the link pin center and said subsequent contact surface and (b) a line extending from the link pin center perpendicular to said ground contacting surface, so that a portion of said inversely-warped initial contact surface would contact a portion of an inversely-warped initial contact surface of an adjacent similar elastic-bodied crawler plate in a crawler band at the beginning of inverse warping of the crawler band, and so that as the inversely-warped angle increases, the contacting portions extend so that said subsequent contact surface contacts a subsequent contact surface of said adjacent similar elastic-bodied crawler plate.

11. A crawler plate in accordance with claim 9, wherein said elastic body comprises a rectangular parallelepiped elastic body section, forming said link mounting surface side of said crawler plate and including the inversely-warped initial contact surfaces, and a trapezoidal elastic body section, forming said ground contacting surface side of said crawler plate and including the subsequent contact surfaces.

12. A crawler plate in accordance with claim 11, wherein a width of said ground contacting surface gradually decreases from a central area of said crawler plate toward each longitudinal end of said crawler plate, without changing the width of said link mounting surface side of said crawler plate.

13. A crawler plate in accordance with claim 12, wherein said trapezoidal elastic body section has longitudinally extending sides and opposite ends, wherein each longitudinally extending side of said trapezoidal elastic body section comprises first and second slanting surfaces with each extending from said central area of said crawler plate to a respective end of said trapezoidal elastic body section.

14. A crawler plate in accordance with claim 13, wherein each end of said trapezoidal elastic body section is in the form of a trapezoidal end surface slanting in an inward direction from said rectangular parallelepiped elastic body section to said ground contacting surface.

15. An elastic-bodied crawler plate having a longitudinal length, a transverse width, a link mounting surface side, a ground contacting surface side, opposite longitudinally extending sides, and opposite longitudinal ends, said crawler plate comprising:

an elastic body including holes for inserting bolts therethrough;

a core body including a link mounting surface; said core body having a plurality of bolt attaching holes formed therein so as to extend through said link mounting surface;

said crawler plate being integrally formed by said core body being embedded in said elastic body with said core body having exposed surfaces which are not covered by said elastic body and with said link mounting surface side including said link mounting surface; said exposed surfaces including bolt head bearing surfaces and said link mounting surface;

wherein said ground contacting surface side includes a ground contacting surface which extends substantially parallel to said link mounting surface and to said longitudinal length of said crawler plate;

wherein said transverse width of the crawler plate is smaller than a link pitch when links are mounted on said link mounting surface;

wherein a width of said ground contacting surface is smaller than said transverse width of said crawler plate;

wherein each longitudinally extending side of said crawler plate includes an inversely-warped initial contact surface, extending from said link mounting surface side toward said ground contacting surface side, and a subsequent contact surface, which connects an edge, closest to said ground contacting surface, of said inversely-warped initial contact surface with an edge of said ground contacting surface;

wherein an angle, which is formed by (a) a line extending from a link pin center of a link, when mounted on said crawler plate, to said inversely-warped initial contact surface and (b) a line extending from the link pin center perpendicular to said ground contacting surface, is equal to or less than an angle, which is formed by (a) a line connecting the link pin center and said subsequent contact surface and (b) a line extending from the link pin center perpendicular to said ground contacting surface, so that a portion of said inversely-warped initial contact surface would contact a portion of an inversely-warped initial contact surface of an adjacent similar elastic-bodied crawler plate in a crawler band at the beginning of inverse warping of the crawler band, and so that as the inversely-warped angle increases, the contacting portions extend so that said subsequent contact surface contacts a subsequent contact surface of said adjacent similar elastic-bodied crawler plate.

16. An endless crawler band comprising:

a plurality of crawler plates positioned adjacent one another in an endless loop, each of said crawler plates being clamped to a respective pair of links by bolts, the pair of links on each crawler plate being connected to the pairs of links on adjacent crawler plates by pins;

each of said crawler plates having a longitudinal length, a transverse width, a link mounting surface side, a ground contacting surface side, opposite longitudinally extending sides, and opposite longitudinal ends, each said crawler plate comprising:

an elastic body including holes for inserting bolts therethrough;

a core body having a smooth top surface, without an abrupt convex or concave form, and a smooth bottom surface, without an abrupt convex or concave form; said smooth top surface including a link mounting surface; said core body having a plurality of bolt attaching holes formed therein so as to extend through said link mounting surface;

said crawler plate being integrally formed by said core body being embedded in said elastic body with said core body having exposed surfaces which are not covered by said elastic body and with said link mounting surface side including said link mounting surface; said exposed surfaces including bolt head bearing surfaces and said link mounting surface.

17. An endless crawler band in accordance with claim 16, wherein each said elastic body comprises a rectangular parallelepiped elastic body section forming an elastic body portion of the link mounting surface side of the crawler plate and a trapezoidal elastic body section forming an elastic body portion of the ground contacting surface side of the crawler plate.

18. An endless crawler band in accordance with claim 17, wherein a width of said ground contacting surface gradually decreases from a central area of the crawler plate toward each longitudinal end of the crawler plate, without changing the width of said link mounting surface side of the crawler plate.

19. An endless crawler band in accordance with claim 18, wherein each said trapezoidal elastic body section has longitudinally extending sides and opposite ends, wherein each longitudinally extending side of the trapezoidal elastic body section comprises first and second slanting surfaces with each extending from said central area of the crawler plate to a respective end of the trapezoidal elastic body section.

20. An endless crawler band in accordance with claim 19, wherein each end of the trapezoidal elastic body section is in the form of a trapezoidal end surface slanting in an inward direction from the rectangular parallelepiped elastic body section to the ground contacting surface.

21. An endless crawler band in accordance with claim 16 wherein the ground contacting surface side includes a ground contacting surface which extends substantially parallel to the link mounting surface and to the longitudinal length of the crawler plate.

22. An endless crawler band in accordance with claim 21 wherein the transverse width of the crawler plate is smaller than a link pitch when links are mounted on the link mounting surface.

23. An endless crawler band in accordance with claim 21 wherein a width of the ground contacting surface is smaller than the transverse width of the crawler plate.

24. An endless crawler band in accordance with claim 23 wherein each longitudinally extending side of the crawler plate includes an inversely-warped initial contact surface, extending from the link mounting surface side toward the ground contacting surface side, and a subsequent contact surface, connecting an edge, closest to the ground contacting surface, of the inversely-warped initial contact surface with an edge of the ground contacting surface.

25. An endless crawler band in accordance with claim 24 wherein an angle, which is formed by (a) a line extending from a link pin center of a link, mounted on the crawler plate, to the inversely-warped initial contact surface and (b) a line extending from the link pin center perpendicular to the ground contacting surface, is equal to or less than an angle, which is formed by (a) a line connecting the link pin center and the subsequent contact surface and (b) a line extending from the link pin center perpendicular to the ground contacting surface, so that a portion of the inversely-warped initial contact surface of one crawler plate contacts a portion of an inversely-warped initial contact surface of an adjacent crawler plate in the crawler band at the beginning of inverse warping of the crawler band, and so that as the inversely-warped angle increases, the contacting portions extend so that the subsequent contact surface contacts a subsequent contact surface of the adjacent crawler plate.

26. An endless crawler band in accordance with claim 24, wherein each elastic body comprises a rectangular parallelepiped elastic body section, forming the link mounting surface side of the crawler plate and including the inversely-warped initial contact surfaces, and a trapezoidal elastic body section, forming the ground contacting surface side of the crawler plate and including the subsequent contact surfaces.

27. An endless crawler band in accordance with claim 26, wherein a width of the ground contacting surface gradually decreases from a central area of the crawler plate toward each longitudinal end of the crawler plate, without changing the width of the link mounting surface side of the crawler plate.

28. An endless crawler band in accordance with claim 27, wherein the trapezoidal elastic body section has longitudinally extending sides and opposite ends, wherein each longitudinally extending side of the trapezoidal elastic body section comprises first and second slanting surfaces with each extending from the central area of the crawler plate to a respective end of the trapezoidal elastic body section.

29. An endless crawler band in accordance with claim 28, wherein each end of the trapezoidal elastic body section is in the form of a trapezoidal end surface slanting in an inward direction from the rectangular parallelepiped elastic body section to the ground contacting surface.

30. An endless crawler band in accordance with claim 26, wherein the inversely-warped initial contact surfaces of an adjacent pair of crawler plates have initial contact portions moving on loci of intersecting circular arcs having their centers at centers of link pins which connect the links of the adjacent pair of crawler plates to other crawler plates, and the initial contact portions are boundary portions between opposing inversely-warped initial contact surfaces and opposing subsequent contact surfaces of said adjacent pair of crawler plates.

31. An endless crawler band in accordance with claim 30, wherein on attaching the pair of crawler plates, having opposing initial contact portions to their links, the attachment is conducted so that the loci of the movement of the opposing initial contact portions move on the loci of intersecting circular arcs, having their centers at centers of link pins which connect the links of the adjacent pair of crawler plates to other crawler plates and having radiuses, so that the pair of crawler plates are clamped to their links with a space between the opposing initial contact portions so that a position of intersection of the opposing initial contact portions contacting and intersecting each other is within the range from the initial contact portions to upper end portions of the link mounting surface sides of the pair of crawler plates.

* * * * *